UNITED STATES PATENT OFFICE.

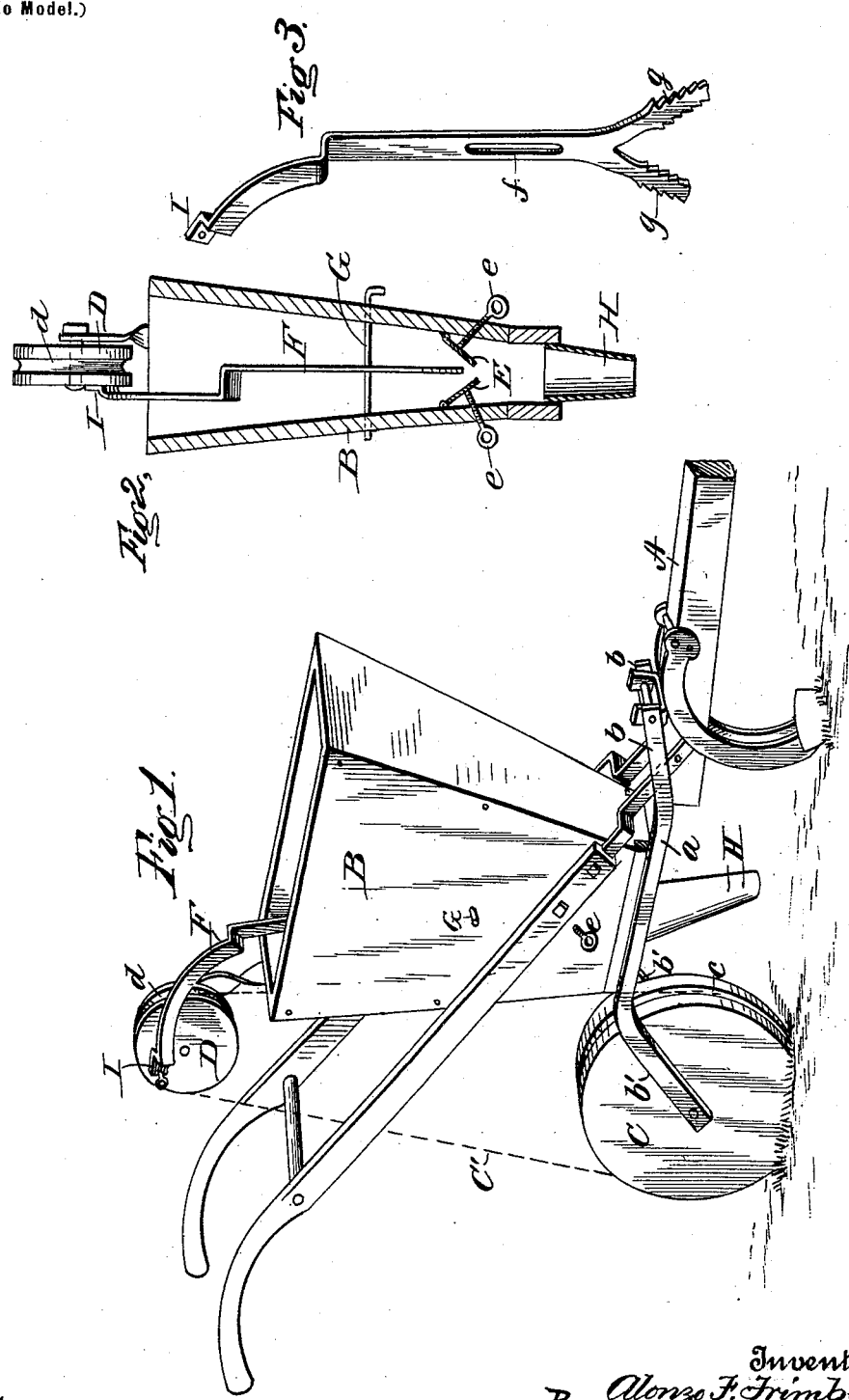

ALONZO FRANKLIN TRIMBLE, OF LONEOAK, GEORGIA.

COTTON-SEED PLANTER.

SPECIFICATION forming part of Letters Patent No. 683,157, dated September 24, 1901.

Application filed February 7, 1901. Serial No. 46,387. (No model.)

*To all whom it may concern:*

Be it known that I, ALONZO FRANKLIN TRIMBLE, a citizen of the United States, residing at Loneoak, in the county of Meriwether and State of Georgia, have invented new and useful Improvements in Cotton-Seed Planters, of which the following is a specification.

This invention has relation to improvements in cotton-seed planters; and it has for its object to provide a simple and ready means for planting the cotton-seed, whereby the same is evenly distributed in the furrow made by the plow; and it consists in the construction and arrangement of parts, as will be hereinafter described, and particularly pointed out in the claims.

In the accompanying drawings, Figure 1 is a perspective view of my improved cotton-seed planter. Fig. 2 is a transverse section through the hopper. Fig. 3 is a detail perspective view of the stirrer or plunger rod.

Referring to the drawings, the letter A denotes the plow-beam with attached plow, and B indicates the hopper of my improved cotton-seed planter. To the bottom edges of the hopper and on opposite sides thereof I detachably connect two arms $a\ a$, the same extending forward in front of the hopper and have upwardly-curved or straight extensions $b\ b$, which are secured to the opposite sides of the plow-beam in any suitable manner. These arms $a\ a$ also extend to the rear of the hopper and are provided with downwardly-bent or straight extensions $b'\ b'$, between which is mounted and adapted to rotate therein a drive-wheel C, having on its peripheral surface a continuous groove $c$.

To the rear top portion of the hopper B is secured by any suitable means a pulley or wheel D, having a peripheral groove $d$ of the same construction as that of the drive-wheel C. A chain C' or other suitable means, preferably the first named, is connected in the grooves of the two wheels C and D, whereby to impart a rotary motion thereto.

To the inner side walls of the hopper and on opposite sides thereof are arranged hinged guideways or chutes E, which are adapted to be adjusted to or from each other by means of thumb-screws $e\ e$, passing through the side walls of the hopper.

F indicates a lever having at or near its central portion an elongated slot $f$, whereby to regulate the vertical up-and-down movement of the same when in operation.

The letter G represents a rod passing through the side walls of the hopper and through the slot $f$ of the lever F, which serves to hold the said lever in proper position during the operation of the same. The lower extremity of the lever is provided with serrated forked ends or arms $g\ g$, which contact with the chutes and serve to stir up the seed and facilitate in forcing the seed through said chutes and into the spout H, from whence they fall into the furrow. The upper end of the lever is bent to form a crank-arm I, the outer end of which is detachably connected to a bearing on the pulley or wheel D.

As hereinbefore stated, the extensions $b\ b$ of the arms $a\ a$ are secured to the plow-beam in any suitable manner; but I wish it to be understood that the body of the hopper is loosely interposed between the plow-handles, whereby to give the same a vibratory motion during the operation of planting the cotton-seed.

I wish it to be understood that I have filed an application for patent, dated November 14, 1900, Serial No. 36,485, in which are shown and described the parts of the present application.

Having described my invention, what I claim is—

1. In a cotton-seed planter, the combination with the hopper, having adjustable chutes therein, of a lever with serrated forked ends, connected in the hopper, and means connected to said lever to operate the same, substantially as specified.

2. In a cotton-seed planter, the combination with the hopper, having adjustable chutes therein, of a slotted lever, with serrated forked ends, a rod passing through the sides of the hopper and through the slot of the lever, the said lever being provided with a crank-arm, and means connected to said arm, whereby to give the same a vertical up-and-down movement, substantially as specified.

In testimony whereof I affix my signature in presence of two witnesses.

ALONZO FRANKLIN TRIMBLE.

Witnesses:
LEE JONES,
J. H. BOOZER.